(12) United States Patent
Lee et al.

(10) Patent No.: US 11,644,599 B2
(45) Date of Patent: May 9, 2023

(54) COVER WINDOW AND DISPLAY APPARATUS INCLUDING THE SAME

(71) Applicant: SAMSUNG DISPLAY CO., LTD., Yongin-si (KR)

(72) Inventors: Dongsung Lee, Yongin-si (KR); Hyunseung Seo, Yongin-si (KR); Hyunkyung Yun, Yongin-si (KR); Jihyun Ko, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/237,983

(22) Filed: Apr. 22, 2021

(65) Prior Publication Data

US 2022/0099864 A1 Mar. 31, 2022

(30) Foreign Application Priority Data

Sep. 25, 2020 (KR) .................. KR10-2020-0124642

(51) Int. Cl.
*G02B 1/14* (2015.01)
*G06F 3/044* (2006.01)
*B32B 7/12* (2006.01)
*B32B 27/30* (2006.01)

(52) U.S. Cl.
CPC ................ *G02B 1/14* (2015.01); *B32B 7/12* (2013.01); *B32B 27/304* (2013.01); *B32B 27/308* (2013.01); *G06F 3/0445* (2019.05); *G06F 3/0446* (2019.05); *B32B 2255/10* (2013.01); *B32B 2255/26* (2013.01); *B32B 2270/00* (2013.01); *B32B 2457/20* (2013.01)

(58) Field of Classification Search
CPC .................................................... G06F 3/0443
See application file for complete search history.

(56) References Cited

U.S. PATENT DOCUMENTS

| | | | |
|---|---|---|---|
| 9,643,389 B2 | 5/2017 | Roh et al. | |
| 9,810,814 B2 | 11/2017 | Lee et al. | |
| 2003/0096102 A1* | 5/2003 | Yoshihara | C09D 7/62 428/458 |
| 2003/0175538 A1* | 9/2003 | Yamaguchi | C08F 255/00 428/515 |
| 2007/0153162 A1* | 7/2007 | Wright | G02B 5/3025 349/96 |
| 2010/0118309 A1* | 5/2010 | Itoh | G01N 21/4738 359/507 |
| 2010/0225831 A1* | 9/2010 | Takeuchi | G09G 3/3666 345/55 |
| 2012/0313887 A1* | 12/2012 | Chen | G06F 3/0445 345/174 |

(Continued)

FOREIGN PATENT DOCUMENTS

| | | |
|---|---|---|
| CN | 110951195 | 4/2020 |
| KR | 10-2015-0020419 | 2/2015 |

(Continued)

*Primary Examiner* — Nan-Ying Yang
(74) *Attorney, Agent, or Firm* — F. Chau & Associates, LLC

(57) ABSTRACT

A cover window includes a window substrate having a first hardness and including polyvinylidene fluoride (PVDF), and a hard coating layer on at least one surface of the window substrate and having a second hardness which is greater than that of the window substrate.

13 Claims, 10 Drawing Sheets

(56) References Cited

U.S. PATENT DOCUMENTS

2016/0029482 A1\* 1/2016 Young .................. G06F 3/0445
                                                                               174/251
2018/0059452 A1\* 3/2018 Jang .................. G06V 40/1306
2019/0138127 A1   5/2019 Seo et al.

FOREIGN PATENT DOCUMENTS

| KR | 10-2016-0002592 | 1/2016 |
| KR | 10-2019-0052730 | 5/2019 |
| KR | 10-2129034 | 6/2020 |

\* cited by examiner

COVER WINDOW AND DISPLAY APPARATUS INCLUDING THE SAME

CROSS-REFERENCE TO RELATED APPLICATION

This application is based on and claims priority under 35 U.S.C. § 119 to Korean Patent Application No. 10-2020-0124642, filed on Sep. 25, 2020, in the Korean Intellectual Property Office, the disclosure of which is incorporated by reference herein in its entirety.

BACKGROUND

1. Field

The present inventive concept relates to a cover window and a display apparatus including the cover window, and more particularly, to a cover window having improved product reliability and a display apparatus including the cover window.

2. Description of Related Art

Electronic devices, such as smart phones, monitors, televisions (TVs), notebooks, and digital cameras, include display apparatuses to display images. A display apparatus visually displays data and includes a display panel that displays an image through a plurality of pixels.

Recently, the usage of display apparatuses has diversified. Also, display apparatuses have become thinner and more lightweight, and thus, the use of display apparatuses has expanded into various applications.

Furthermore, because recent display apparatuses include a touch panel, information may be input from the outside through a user's touch on a display screen. Therefore, there are many cases in which a user's fingers or the like touches the surface of the cover window, and the cover window may affect the sensing sensitivity (or touch sensitivity) of the touch panel.

SUMMARY

One or more embodiments include a cover window having considerable sensing sensitivity while having considerable flexibility, hardness, and scratch resistance, and a display apparatus including the cover window. However, this is merely an example, and the scope of the disclosure is not limited thereby.

Additional aspects will be set forth in part in the description which follows and, in part, will be apparent from the description, or may be learned by practice of the presented embodiments of the disclosure.

According to one or more embodiments of the present inventive concept, a cover window includes a window substrate having a first hardness and including polyvinylidene fluoride (PVDF), and a hard coating layer on at least one surface of the window substrate and having a second hardness which is greater than that of the window substrate.

The window substrate includes a copolymer of a first polymer resin and the PVDF.

The first polymer resin includes polymethyl methacrylate (PMMA).

A relative permittivity of the window substrate has a value from about 3 to about 6.

A thickness of the window substrate has a value from about 100 μm to about 650 μm.

The hard coating layer includes a first hard coating layer that is on a first surface of the window substrate and has a thickness less than that of the window substrate.

The thickness of the first hard coating layer has a value from about 10 μm to about 50 μm.

A hardness of the first hard coating layer is greater than that of the window substrate, and when the hardness of the first hard coating layer is measured in a pencil hardness, the hardness of the first hard coating layer has a value of at least 7H.

The hard coating layer further includes a second hard coating layer on a second surface opposite to the first surface of the window substrate.

A thickness of the second hard coating layer has a value from about 5 μm to about 20 μm.

The hard coating layer includes polysilsesquioxane or an acrylic polymer material.

The sum of a thickness of the window substrate and a thickness of the hard coating layer has a value from about 150 μm to about 700 μm.

According to one or more embodiments of the present inventive concept, a display apparatus includes a display panel configured to provide an image, and a cover window on the display panel, wherein the cover window includes a window substrate including polyvinylidene fluoride (PVDF), and a hard coating layer on at least one surface of the window substrate.

The window substrate may include a copolymer of polymethyl methacrylate (PMMA) and the PVDF.

The display apparatus further includes an input sensing layer between the display panel and the cover window and including sensing electrodes and trace lines electrically connected to the sensing electrodes, and an adhesive layer between the input sensing layer and the cover window.

A relative permittivity of the adhesive layer is greater than a relative permittivity of the window substrate.

A thickness of the adhesive layer has a value from about 100 μm to about 300 μm.

A relative permittivity of the window substrate has a value from about 3 to about 6, and a thickness of the window substrate has a value from about 100 μm to about 650 μm.

The hard coating layer has a thickness having a value from about 10 μm to about 50 μm, and has a hardness greater than that of the window substrate.

The sum of a thickness of the window substrate and a thickness of the hard coating layer has a value from about 150 μm to about 700 μm.

According to one or more embodiments of the present inventive concept, a display apparatus includes a display panel configured to provide an image, a window substrate disposed on the display panel and comprising a copolymer of a first polymer resin and polyvinylidene fluoride (PVDF), a relative permittivity of the window substrate having a value from about 3 to about 6, and a first hard coating layer on the window substrate. The first hard coating layer includes a fluorine-based compound, and wherein the window substrate is disposed between the display panel and the first hard coating layer.

Other aspects, features and advantages of the disclosure will become better understood through the accompanying drawings, the claims and the detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
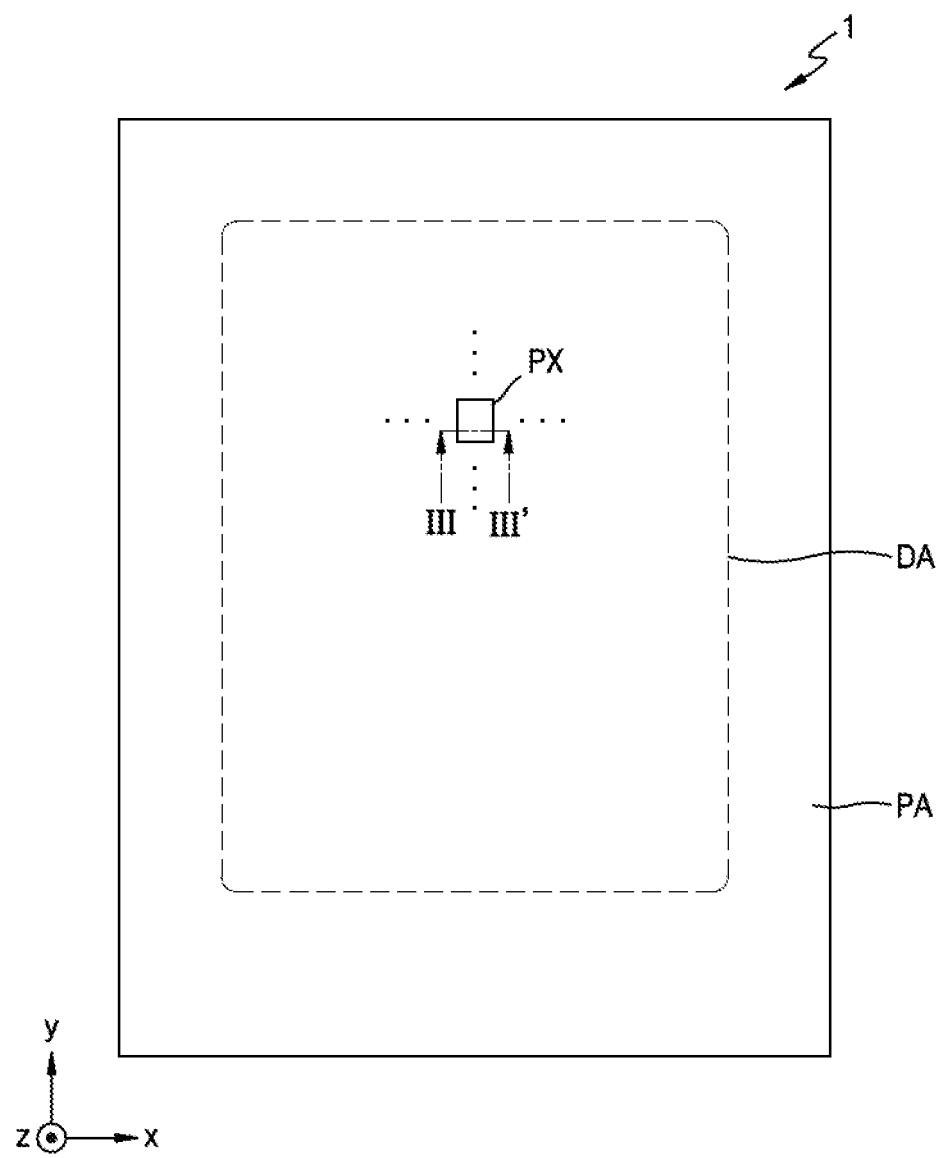
FIG. 1 is a schematic plan view of a display apparatus according to an embodiment of the present inventive concept.

As the present description allows for various changes and numerous embodiments, certain embodiments will be illustrated in the drawings and described in detail in the written description. Effects and features of the disclosure, and methods of achieving them will be clarified with reference to embodiments described below in detail with reference to the drawings. However, the disclosure is not limited to the following embodiments and may be embodied in various forms.

The embodiments of the disclosure will be described below in more detail with reference to the accompanying drawings. Those elements that are the same or are in correspondence with each other are rendered the same reference numeral regardless of the figure number, and redundant explanations are omitted.

It will be understood that although the terms "first," "second," etc. may be used herein to describe various elements, these elements should not be limited by these terms. These terms are only used to distinguish one element from another.

The singular forms "a," "an," and "the" as used herein are intended to include the plural forms as well unless the context clearly indicates otherwise.

It will be further understood that the terms "comprises" and/or "comprising" used herein specify the presence of stated features or elements, but do not preclude the presence or addition of one or more other features or elements.

It will be further understood that, when a layer, region, or element is referred to as being "on" another layer, region, or element, it can be directly or indirectly on the other layer, region, or element. For example, intervening layers, regions, or elements may be present.

Sizes of elements in the drawings may be exaggerated or reduced for convenience of explanation. For example, because sizes and thicknesses of elements in the drawings are arbitrarily illustrated for convenience of explanation, the disclosure is not limited thereto.

When a certain embodiment may be implemented differently, a specific process order may be performed differently from the described order. For example, two consecutively described processes may be performed substantially at the same time or performed in an order opposite to the described order.

In this specification, the expression "A and/or B" indicates only A, only B, or both A and B. Throughout the disclosure, the expression "at least one of A and B" indicates only A, only B, or both A and B.

It will be further understood that, when layers, regions, or components are referred to as being connected to each other, they may be directly connected to each other or indirectly connected to each other with intervening layers, regions, or components therebetween. For example, when layers, regions, or components are referred to as being electrically connected to each other, they may be directly electrically connected to each other or indirectly electrically connected to each other with intervening layers, regions, or components therebetween.

The x-axis, the y-axis, and the z-axis are not limited to three axes of the rectangular coordinate system and may be interpreted in a broader sense. For example, the x-axis, the y-axis, and the z-axis may be perpendicular to one another or may represent different directions that are not perpendicular to one another.

FIG. 1 is a schematic plan view of a display apparatus 1 according to an embodiment.

Referring to FIG. 1, the display apparatus 1 may include a display area DA and a peripheral area PA outside the display area DA. The display apparatus 1 may display an image through an array of a plurality of pixels PX that are two-dimensionally arranged in the display area DA.

The peripheral area PA is an area that does not display an image, and may completely or partially surround the display area DA. A driver or the like, which provides an electric signal or power to a pixel circuit corresponding to each of the pixels PX, may be arranged in the peripheral area PA. A pad, which is an area to which an electronic device or a printed circuit board may be electrically connected, may be arranged in the peripheral area PA.

The display apparatus 1 includes an organic light-emitting diode (OLED) as a light-emitting element, but the display apparatus 1 of the disclosure is not limited thereto. According to another embodiment, the display apparatus 1 may include a light-emitting display apparatus including an inorganic light-emitting diode, that is, an inorganic light-emitting display. The inorganic light-emitting diode may include a PN junction diode including inorganic semiconductor-based materials. When a voltage is applied to the PN junction diode in a forward direction, holes and electrons may be injected and recombined to generate energy. The PN junction diode may convert the generated energy into light energy to emit light of a certain color. The inorganic light-emitting diode may have a width of several micrometers to several hundred micrometers. In some embodiments, the inorganic light-emitting diode may be referred to as a micro light-emitting diode (LED). According to another embodiment, the display apparatus 1 may include a quantum dot light-emitting display.

The display apparatus 1 may be used as display screens for various products such as not only portable electronic devices, such as mobile phones, smart phones, tablet personal computers (PCs), mobile communication terminals, electronic notebooks, e-books, portable multimedia players (PMPs), navigations, and ultra mobile PCs (UMPCs), and but also televisions (TVs), laptops, monitors, billboards, and internet of things (IOT) devices. The display apparatus 1 according to an embodiment may also be used in wearable devices, such as smart watches, watch phones, glasses-type displays, or head mounted displays (HMDs). The display apparatus 1 according to an embodiment may also be used as dashboards of automobiles, center information displays (CIDs) of the center fascia or dashboards of automobiles, room mirror displays that replace the side mirrors of automobiles, and display screens arranged on the rear sides of front seats to serve as entertainment devices for back seat passengers of automobiles.

Figure 2:
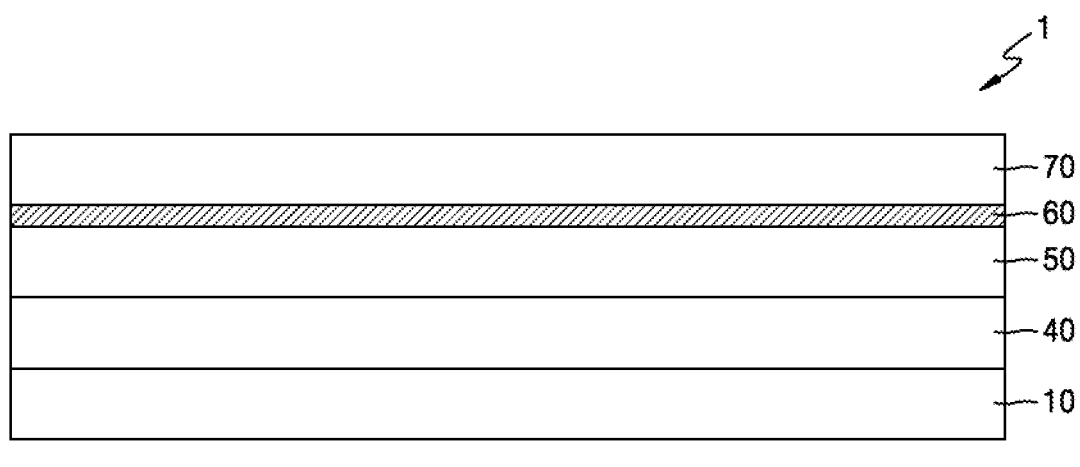
FIG. 2 is a schematic cross-sectional view of a display apparatus according to an embodiment of the present inventive concept.

FIG. 2 is a schematic cross-sectional view of a display apparatus 1 according to an embodiment.

Referring to FIG. 2, the display apparatus 1 may include a display panel 10, and an input sensing layer 40 and an optical functional layer 50, which are on the display panel 10. The display panel 10, the input sensing layer 40, and the optical functional layer 50 may be covered by a cover window 70.

The display panel 10 may include a plurality of light-emitting elements and a plurality of pixel circuits electrically connected to the light-emitting elements, and may display an image through light emitted from the light-emitting elements.

The input sensing layer 40 may obtain coordinate information according to an external input, for example, a touch event. The input sensing layer 40 may include sensing electrodes (or touch electrodes) and trace lines electrically connected to the sensing electrodes. The input sensing layer 40 may be on the display panel 10. The input sensing layer 40 may sense an external input using a mutual cap method or a self cap method.

The input sensing layer 40 may be on the display panel 10. Alternatively, the input sensing layer 40 may be formed separately and then bonded through an adhesive member (not illustrated). As the adhesive member, any general members known in the art may be used without limitation. The adhesive member may include an optical clear adhesive (OCA). According to an embodiment, as illustrated in FIG. 2, the input sensing layer 40 may be on the display panel 10. The adhesive member is not between the input sensing layer 40 and the display panel 10.

The optical functional layer 50 may include an anti-reflective layer. The anti-reflective layer may reduce reflectance of light (external light) incident from the outside toward the display panel 10 through the cover window 70. The anti-reflective layer may include a retarder and a polarizer. The retarder may be a film-type retarder or a liquid crystal coating-type retarder. In an embodiment, the retarder is a λ/2 retarder and/or a λ/4 retarder. The polarizer may be a film-type polarizer or a liquid crystal coating-type polarizer. The film-type polarizer may include a stretched synthetic resin film, and the liquid crystal coating-type polarizer may include liquid crystals arranged in a certain array. The retarder and the polarizer may further include a protective film.

According to another embodiment, the anti-reflective layer may include a structure of a black matrix and color filters. The color filters may be arranged to pass through corresponding colors of light emitted from each pixel of the display panel 10. According to another embodiment, the anti-reflective layer may include a destructive interference structure. The destructive interference structure may include a first reflective layer and a second reflective layer, which are on different layers from each other. First reflected light and second reflected light, which are respectively reflected from the first reflective layer and the second reflective layer, may destructively interfere with each other. Thus, the reflectance of external light is reduced.

The optical functional layer 50 may include a lens layer. The lens layer may improve the light emission efficiency of light emitted from the display panel 10, or may reduce color deviation. The lens layer may include a layer having a concave or convex lens shape, and/or may include a plurality of layers having different refractive indices from each other. The optical functional layer 50 may include either or both of the anti-reflective layer and the lens layer described above.

An adhesive member (not illustrated) may be between the input sensing layer 40 and the optical functional layer 50. As the adhesive member, any general members known in the art may be used without limitation. The adhesive member may include an OCA.

The cover window 70 may have a high transmittance sufficient to transmit light emitted from the display panel 10, and may have a small thickness to minimize the weight of the display apparatus 1. To protect the display panel 10 from external impact, the cover window 70 may have strong strength and hardness and may have high impact resistance and scratch resistance.

An adhesive layer 60 may be between the input sensing layer 40 and the cover window 70 and between the optical functional layer 50 and the cover window 70. The cover window 70 may be bonded to an underlying element, for example, the optical functional layer 50, through the adhesive layer 60. According to an embodiment, the adhesive layer 60 may include an OCA.

Figure 3:
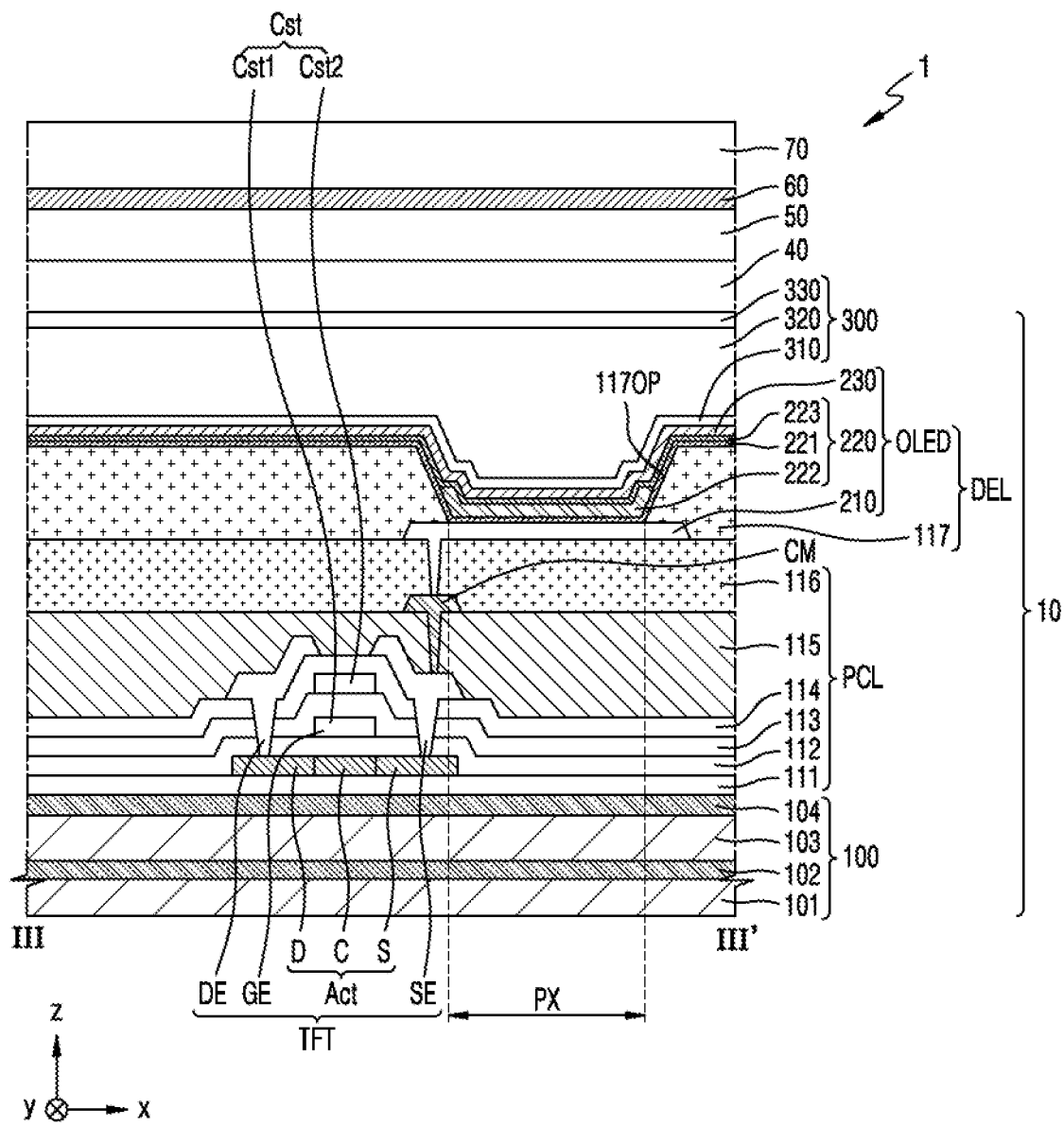
FIG. 3 is a schematic cross-sectional view of a display apparatus according to an embodiment of the present inventive concept.

FIG. 3 is a schematic cross-sectional view of a display apparatus 1 according to an embodiment, taken along line III-III' of FIG. 1. The same reference numerals denote the same or corresponding elements among the elements described above with reference to FIG. 2, and redundant descriptions thereof are omitted.

Referring to FIG. 3, the display apparatus 1 may include a display panel 10, and the display panel 10 may include a stack structure of a substrate 100, a pixel circuit layer PCL, a display element layer DEL, and an encapsulation layer 300.

The substrate 100 may have a multilayer structure including an inorganic layer and a base layer including a polymer resin. For example, the substrate 100 may include barrier layers of an inorganic insulating layer and a base layer including a polymer resin. For example, the substrate 100 may include a first base layer 101, a first barrier layer 102, a second base layer 103, and a second barrier layer 104, which are sequentially stacked on each other. Each of the first base layer 101 and the second base layer 103 may include polyimide (PI), polyethersulfone (PES), polyarylate, polyetherimide (PEI), polyethylene naphthalate (PEN), polyethylene terephthalate (PET), polyphenylene sulfide (PPS), polycarbonate (PC), cellulose triacetate (TAC), and/or cellulose acetate propionate (CAP). Each of the first barrier layer 102 and the second barrier layer 104 may include an inorganic insulating material such as silicon oxide, silicon oxynitride, and/or silicon nitride. The substrate 100 may be flexible.

The pixel circuit layer PCL is on the substrate 100. FIG. 3 illustrates that the pixel circuit layer PCL includes a thin-film transistor TFT, a buffer layer 111, a first gate insulating layer 112, a second gate insulating layer 113, an interlayer insulating layer 114, a first planarization insulating layer 115, and a second planarization insulating layer 116, which are below and/or above elements of the thin-film transistor TFT.

The buffer layer 111 may reduce or prevent infiltration of a foreign material, moisture, or ambient air from below the substrate 100, and may provide a flat surface on the substrate 100. The buffer layer 111 may include an inorganic insulating material such as silicon oxide, silicon oxynitride, or silicon nitride, and may have a single layer structure or a multilayer structure including the above-described material.

The thin-film transistor TFT on the buffer layer 111 may include a semiconductor layer Act, and the semiconductor layer Act may include polysilicon. Alternatively, the semiconductor layer Act may include amorphous silicon, an oxide semiconductor, or an organic semiconductor. The semiconductor layer Act may include a channel region C, and a drain region D and a source region S on opposite sides of the channel region C. A gate electrode GE may overlap the channel region C.

The gate electrode GE may include a low resistance metal material. The gate electrode GE may include a conductive material including molybdenum (Mo), aluminum (Al), copper (Cu), titanium (Ti), and the like, and may include a single layer or multiple layers including the above-described material.

The first gate insulating layer 112 between the semiconductor layer Act and the gate electrode GE may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO).

The second gate insulating layer 113 may be arranged to cover the gate electrode GE. Similar to the first gate insulating layer 112, the second gate insulating layer 113 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO).

An upper electrode Cst2 of a storage capacitor Cst may be on the second gate insulating layer 113. The upper electrode Cst2 may overlap the gate electrode GE therebelow. The gate electrode GE and the upper electrode Cst2 overlapping each other with the second gate insulating layer 113 therebetween may form the storage capacitor Cst. The gate electrode GE may function as a lower electrode Cst1 of the storage capacitor Cst.

As such, the storage capacitor Cst and the thin-film transistor TFT may overlap each other. According to some embodiments, the storage capacitor Cst does not overlap the thin-film transistor TFT.

The upper electrode Cst2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may include a single layer or multiple layers including the above-described material.

The interlayer insulating layer 114 may cover the upper electrode Cst2. The interlayer insulating layer 114 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide (ZnO). The interlayer insulating layer 114 may include a single layer or multiple layers including the above-described inorganic insulating material.

A drain electrode DE and a source electrode SE may be on the interlayer insulating layer 114. The drain electrode DE and the source electrode SE may be respectively connected to the drain region D and the source region S through contact holes formed in the insulating layers therebelow. Each of the drain electrode DE and the source electrode SE may include a material having good conductivity. Each of the drain electrode DE and the source electrode SE may include a conductive material including molybdenum (Mo), aluminum (Al), copper (Cu), titanium (Ti), and the like, and may include a single layer or multiple layers including the above-described material. According to an embodiment, the drain electrode DE and the source electrode SE may have a multilayer structure of Ti/Al/Ti.

The first planarization insulating layer 115 may cover the drain electrode DE and the source electrode SE. The first planarization insulating layer 115 may include an organic insulating material such as a polymer (e.g., polymethyl methacrylate (PMMA) or polystyrene (PS)), a polymer derivative having a phenol-based group, an acrylic polymer, an imide-based polymer, an aryl ether-based polymer, an amide-based polymer, a fluorine-based polymer, a p-xylene-based polymer, a vinyl alcohol-based polymer, and a blend thereof.

The second planarization insulating layer 116 may be on the first planarization insulating layer 115. The second planarization insulating layer 116 may include the same material as that of the first planarization insulating layer 115, and may include an organic insulating material such as a polymer (e.g., PMMA or PS), a polymer derivative having a phenol-based group, an acrylic polymer, an imide-based polymer, an aryl ether-based polymer, an amide-based polymer, a fluorine-based polymer, a p-xylene-based polymer, a vinyl alcohol-based polymer, and a blend thereof.

The display element layer DEL may be on the pixel circuit layer PCL having the above-described structure. The display element layer DEL may include an organic light-emitting diode OLED as a display element (i.e., a light-emitting element), and the organic light-emitting diode OLED may include a stack structure of a pixel electrode 210, a middle layer 220, and a common electrode 230. For example, the organic light-emitting diode OLED may emit red light, green light, or blue light, or may emit red light, green light, blue light, or white light. The organic light-emitting diode OLED may emit light through an emission area, and the emission area may be defined as a pixel PX.

The pixel electrode 210 of the organic light-emitting diode OLED may be electrically connected to the thin-film transistor TFT through contact holes formed in the second planarization insulating layer 116 and the first planarization insulating layer 115. A contact metal CM may be arranged on the first planarization insulating layer 115 to facilitate the connection between the pixel electrode 210 and the thin-film transistor TFT.

The pixel electrode 210 may include conductive oxide such as indium tin oxide (ITO), indium zinc oxide (IZO), zinc oxide (ZnO), indium oxide ($In_2O_3$), indium gallium oxide (IGO), or aluminum zinc oxide (AZO). According to another embodiment, the pixel electrode 210 may include a reflective layer including silver (Ag), magnesium (Mg), aluminum (Al), platinum (Pt), palladium (Pd), gold (Au), nickel (Ni), neodymium (Nd), Iridium (Ir), chromium (Cr), or any compound thereof. According to another embodiment, the pixel electrode 210 may further include a layer including ITO, IZO, ZnO, or $In_2O_3$ above and/or below the reflective layer.

A pixel defining layer 117 having an opening 1170P exposing the central portion of the pixel electrode 210 is on the pixel electrode 210. The pixel defining layer 117 may include an organic insulating material and/or an inorganic insulating material. The opening 1170P may define an emission area through which the organic light-emitting diode OLED emits light. For example, the size and/or width of the opening 1170P may correspond to the size and/or width of the emission area. Therefore, the size and/or width of the pixel PX may depend on the size and/or width of the opening 1170P of the corresponding pixel defining layer 117.

The middle layer 220 may include an emission layer 222 formed on the pixel electrode 210. The emission layer 222 may include a high molecular weight organic material or a low molecular weight organic material that emits light of a certain color. Alternatively, the emission layer 222 may include an inorganic emission material or quantum dots.

According to an embodiment, the middle layer 220 may include a first functional layer 221 and a second functional layer 223 below and above the emission layer 222, respectively. The first functional layer 221 may include, for example, a hole transport layer (HTL), or may include an HTL and a hole injection layer (HIL). The second functional layer 223 may be on the emission layer 222, and may include an electron transport layer (ETL) and/or an electron injection layer (EIL). Like a common electrode 230 to be described later, the first functional layer 221 and/or the second functional layer 223 may be a common layer entirely covering the substrate 100.

The common electrode 230 may be on the pixel electrode 210 and may overlap the pixel electrode 210. The common electrode 230 may include a conductive material having a low work function. For example, the common electrode 230 may include a transparent or semi-transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or any alloy thereof. Alternatively, the common electrode 230 may further include a layer such as ITO, IZO, ZnO, or $In_2O_3$ on the transparent layer or the semi-transparent layer including the above-described material. The common electrode 230 may be integrally formed to entirely cover the substrate 100.

The encapsulation layer 300 may be on the display element layer DEL and may cover the display element layer DEL. The encapsulation layer 300 includes at least one inorganic encapsulation layer and at least one organic encapsulation layer. As an embodiment, FIG. 3 illustrates that the encapsulation layer 300 includes a first inorganic encapsulation layer 310, an organic encapsulation layer 320, and a second inorganic encapsulation layer 330, which are sequentially stacked on each other.

Each of the first inorganic encapsulation layer 310 and the second inorganic encapsulation layer 330 may include one or more inorganic materials selected from aluminum oxide, titanium oxide, tantalum oxide, hafnium oxide, zinc oxide, silicon oxide, silicon nitride, and silicon oxynitride. The organic encapsulation layer 320 may include a polymer-based material. The polymer-based material may include an acrylic resin, an epoxy-based resin, polyimide, polyethylene, and the like. According to an embodiment, the organic encapsulation layer 320 may include acrylate. The organic encapsulation layer 320 may be formed by curing a monomer or applying a polymer. The organic encapsulation layer 320 may be transparent.

Figure 4:
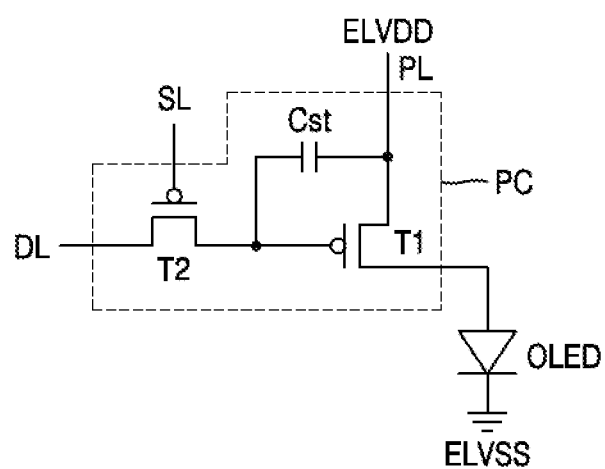
FIG. 4 is an equivalent circuit diagram of a pixel circuit included in a display apparatus according to an embodiment of the present inventive concept.

FIG. 4 is an equivalent circuit diagram of a pixel circuit PC included in a display apparatus, according to an embodiment.

Referring to FIG. 4, the pixel circuit PC may include a plurality of thin-film transistors and a storage capacitor, and may be electrically connected to an organic light-emitting diode OLED. According to an embodiment, the pixel circuit PC may include a driving thin-film transistor T1, a switching thin-film transistor T2, and a storage capacitor Cst.

The switching thin-film transistor T2 may be connected to a scan line SL and a data line DL and may transmit a data voltage or a data voltage input from the data line DL to the driving thin-film transistor T1 based on a scan signal or a switching voltage input from the scan line SL. The storage capacitor Cst may be connected to the switching thin-film transistor T2 and a driving voltage line PL and may store a voltage corresponding to a difference between a voltage received from the switching thin-film transistor T2 and a first power supply voltage ELVDD supplied to the driving voltage line PL.

The driving thin-film transistor T1 may be connected to the driving voltage line PL and the storage capacitor Cst and may control a driving current flowing from the driving voltage line PL to the organic light-emitting diode OLED in response to a voltage value stored in the storage capacitor Cst. A common electrode (e.g., a cathode) of the organic light-emitting diode OLED may receive a second power supply voltage ELVSS. The organic light-emitting diode OLED may emit light having a certain luminance according to the driving current.

Although a case in which the pixel circuit PC includes two thin-film transistors and one storage capacitor has been described, the disclosure is not limited thereto. For example, the pixel circuit PC may include three or more thin-film transistors and/or two or more storage capacitors. According to an embodiment, the pixel circuit PC may include seven thin-film transistors and one storage capacitor. The number of thin-film transistors and the number of storage capacitors may be variously changed according to the design of the pixel circuit PC. However, for convenience of description, a case in which the pixel circuit PC includes two thin-film transistors and one storage capacitor will be described.

Figure 5:
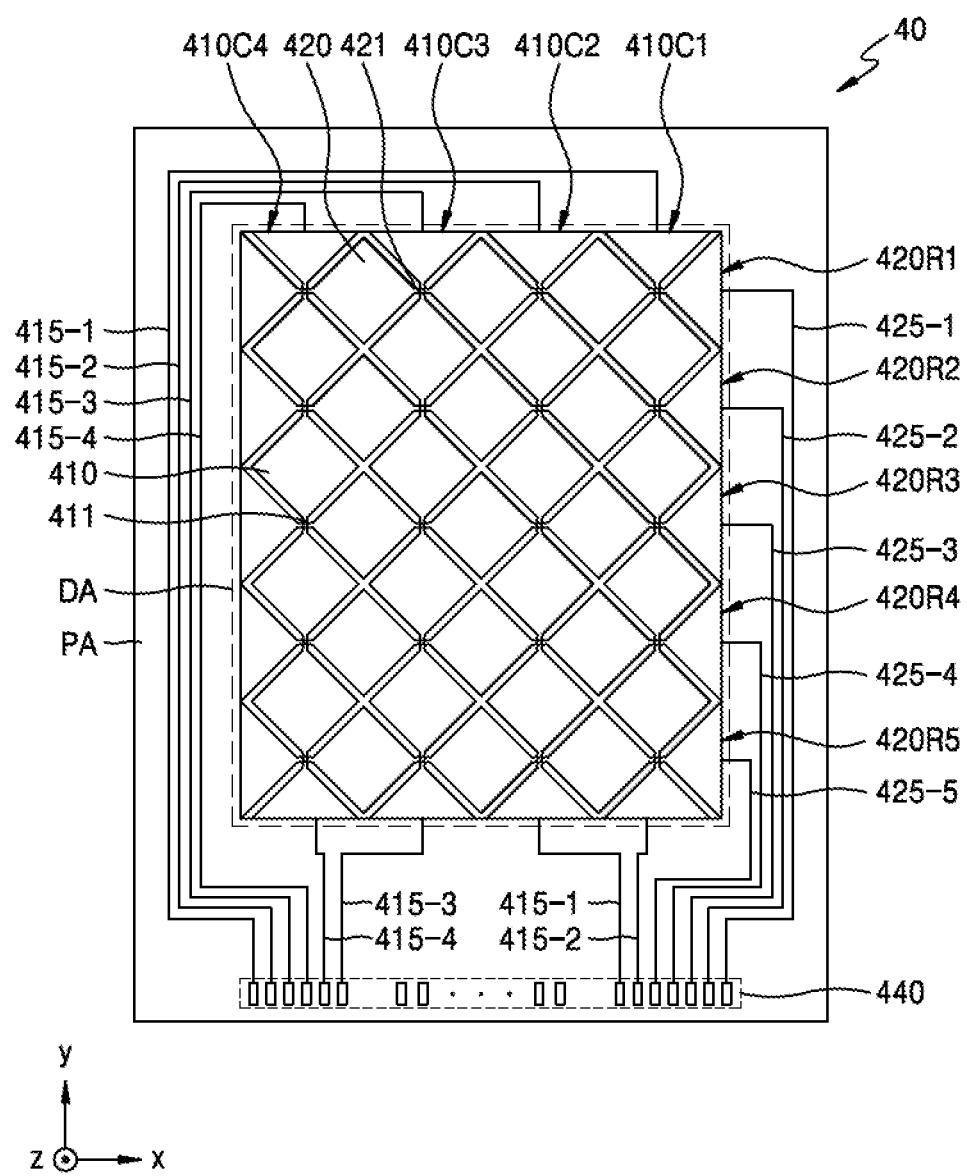
FIG. 5 is a schematic plan view of an input sensing layer of a display apparatus according to an embodiment of the present inventive concept.

FIG. 5 is a schematic plan view of an input sensing layer 40 of a display apparatus, according to an embodiment.

Referring to FIG. 5, the input sensing layer 40 may include first sensing electrodes 410, first trace lines 415-1 to 415-4 connected to the first sensing electrodes 410, second sensing electrodes 420, and second trace lines 425-1 to 425-5 connected to the second sensing electrodes 420. The first sensing electrodes 410 and the second sensing electrodes 420 may be arranged in a display area DA, and the first trace lines 415-1 to 415-4 and the second trace lines 425-1 to 425-5 may be arranged in a peripheral area PA.

The first sensing electrodes 410 may be arranged in the ±y direction, and the second sensing electrodes 420 may be arranged in the ±x direction intersecting with the ±y direction. The first sensing electrodes 410 arranged in the ±y direction may be connected to each other by first connection electrodes 411 between the adjacent first sensing electrodes 410 to form first sensing lines 410C1 to 410C4, respectively. The second sensing electrodes 420 arranged in the ±x direction may be connected to each other by second connection electrodes 421 between the adjacent second sensing electrodes 420 to form second sensing lines 420R1 to 420R5, respectively. The first sensing lines 410C1 to 410C4 and the second sensing lines 420R1 to 420R5 may intersect with each other. For example, the first sensing lines 410C1 to 410C4 and the second sensing lines 420R1 to 420R5 may perpendicularly intersect with each other.

The first sensing lines 410C1 to 410C4 may be connected to pads of a sensing signal pad part 440 through the first trace lines 415-1 to 415-4 formed in the peripheral area PA. For example, the first trace lines 415-1 to 415-4 may have a double routing structure. The first trace lines 415-1 to 415-4 may be respectively connected to the upper and lower sides of the first sensing lines 410C1 to 410C4. The first trace lines 415-1 to 415-4 respectively connected to the upper and lower sides of the first sensing lines 410C1 to 410C4 may be connected to the corresponding pads.

The second sensing lines 420R1 to 420R5 may be connected to the pads of the sensing signal pad part 440 through the second trace lines 425-1 to 425-5 formed in the peripheral area PA. For example, the second trace lines 425-1 to 425-5 may be connected to the corresponding pads.

FIG. 5 illustrates the double routing structure in which the first trace lines 415-1 to 415-4 are connected to both the upper sides and the lower sides of the first sensing lines 410C1 to 410C4, respectively. The double routing structure may improve sensing sensitivity (or touch sensitivity). However, the disclosure is not limited thereto. According to another embodiment, the first trace lines 415-1 to 415-4 may have a single routing structure. The first trace lines 415-1 to 415-4 may be connected to the upper sides and the lower sides of the first sensing lines 410C1 to 410C4, respectively.

Figure 6:
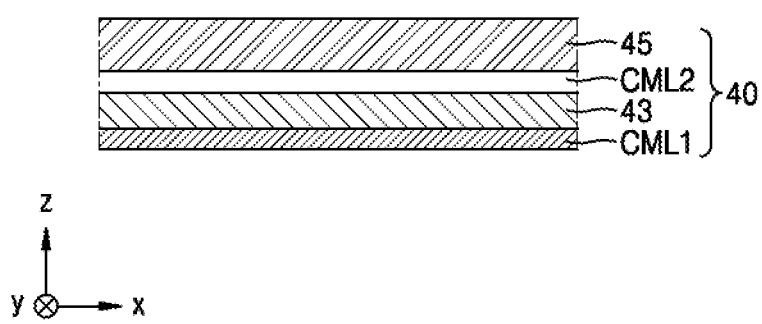
FIG. 6 is a cross-sectional view illustrating a stack structure of an input sensing layer according to an embodiment of the present inventive concept.

FIG. 6 is a cross-sectional view illustrating a stack structure of an input sensing layer 40 according to an embodiment.

Referring to FIG. 6, the input sensing layer 40 may include a first conductive layer CML1 and a second conductive layer CML2. A first insulating layer 43 may be between the first conductive layer CML1 and the second conductive layer CML2, and a second insulating layer 45 may be on the second conductive layer CML2. Each of the first sensing electrodes (see 410 of FIG. 5), the first connection electrodes (see 411 of FIG. 5), the second sensing electrodes (see 420 of FIG. 5), and the second connection electrodes (see 421 of FIG. 5) may be included in either the first conductive layer CML1 or the second conductive layer CML2.

The first and second conductive layers CML1 and CML2 may include a metal layer or a transparent conductive layer. The metal layer may include molybdenum (Mo), mendelevium (Mb), silver (Ag), titanium (Ti), copper (Cu), aluminum (Al), and any alloy thereof. The transparent conductive layer may include a transparent conductive oxide such as ITO, IZO, ZnO, and indium tin zinc oxide (ITZO). The transparent conductive layer may include a conductive polymer such as poly(3,4-ethylenedioxythiophene) (PEDOT), metal nanowires, or graphene.

The first and second conductive layers CML1 and CML2 may include a single or multiple layers. The single-layered first and second conductive layers CML1 and CML2 may include a metal layer or a transparent conductive layer, and materials of the metal layer and the transparent conductive layer are the same as described above. Either the first conductive layer CML1 or the second conductive layer CML2 may include a single metal layer. The single metal layer may include a molybdenum layer or an alloy layer of MoMd. Either the first conductive layer CML1 or the second conductive layer CML2 may include a multilayered metal layer. The multilayered metal layer may include, for example, three layers of a titanium layer/aluminum layer/titanium layer, or may include two layers of a molybdenum layer/mendelevium layer. Alternatively, the multilayered metal layer may include a metal layer and a transparent conductive layer. The first and second conductive layers CML1 and CML2 may have different stack structures or may have the same stack structure. For example, the first conductive layer CML1 may include a metal layer, and the second conductive layer CML2 may include a transparent conductive layer. Alternatively, the first and second conductive layers CML1 and CML2 may include the same metal layer.

The materials of the first and second conductive layers CML1 and CML2, and the arrangement of the sensing electrodes provided in the first and second conductive layers CML1 and CML2 may be formed to secure sensing sensitivity. An RC delay may affect the sensing sensitivity. Because the sensing electrodes including the metal layer have a low resistance compared with the transparent conductive layers, an RC delay of the sensing electrodes with the metal layer may be reduced. Therefore, the charging time of the capacitor defined between the sensing electrodes may be reduced. The sensing electrodes including the transparent conductive layers are not visible to a user compared with the metal layers, and the input area may increase, thereby increasing the capacitance.

Each of the first and second insulating layers 43 and 45 may include an inorganic insulating material or/and an organic insulating material. The inorganic insulating material may include silicon oxide, silicon nitride, or silicon oxynitride, and the organic insulating material may include a high molecular weight organic material.

Some of the first and second sensing electrodes 410 and 420, and the first and second connection electrodes 411 and 421 described above with reference to FIG. 5 may be located at the first conductive layer CML1, and the others thereof may be located at the second conductive layer CML2. According to an embodiment, the first conductive layer CML1 may include the first connection electrodes 411, and the second conductive layer CML2 may include the first and second sensing electrodes 410 and 420, and the second connection electrodes 421. According to another embodiment, the first conductive layer CML1 may include the first and second sensing electrodes 410 and 420, and the second connection electrodes 421, and the second conductive layer CML2 may include the first connection electrodes 411. According to another embodiment, the first conductive layer CML1 may include the first sensing electrodes 410 and the first connection electrodes 411, and the second conductive layer CML2 may include the second sensing electrodes 420 and the second connection electrodes 421. The first sensing electrodes 410 and the first connection electrodes 411 are provided at the same layer and integrally connected to each other, and the second sensing electrodes 420 and the second connection electrodes 421 are also at the same layer. Therefore, no contact holes may be provided in the insulating layer between the first conductive layer CML1 and the second conductive layer CML2.

FIG. 6 illustrates that the input sensing layer 40 includes the first conductive layer CML1, the first insulating layer 43, the second conductive layer CML2, and the second insulating layer 45, but in another embodiment, a layer including an inorganic insulating material, or an organic insulating material may be further arranged under the first conductive layer CML1.

Figure 7A:
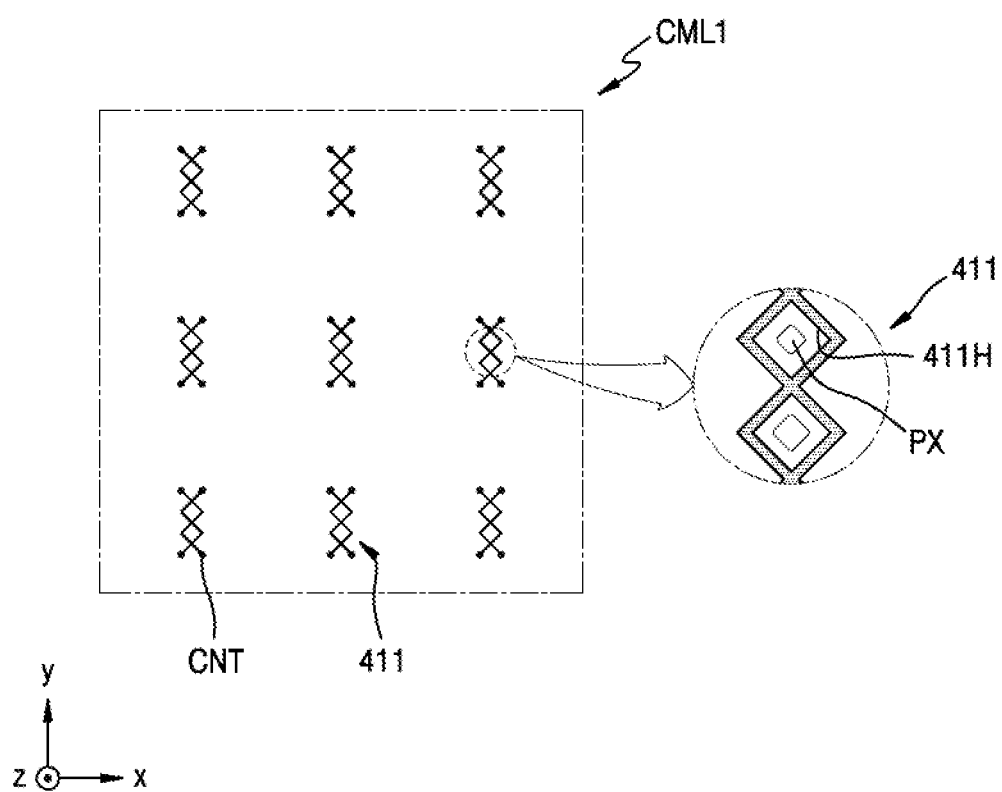
FIGS. 7A and 7B are respectively plan views of a first conductive layer and a second conductive layer in an input sensing layer according to an embodiment of the present inventive concept.
Figure 7B:
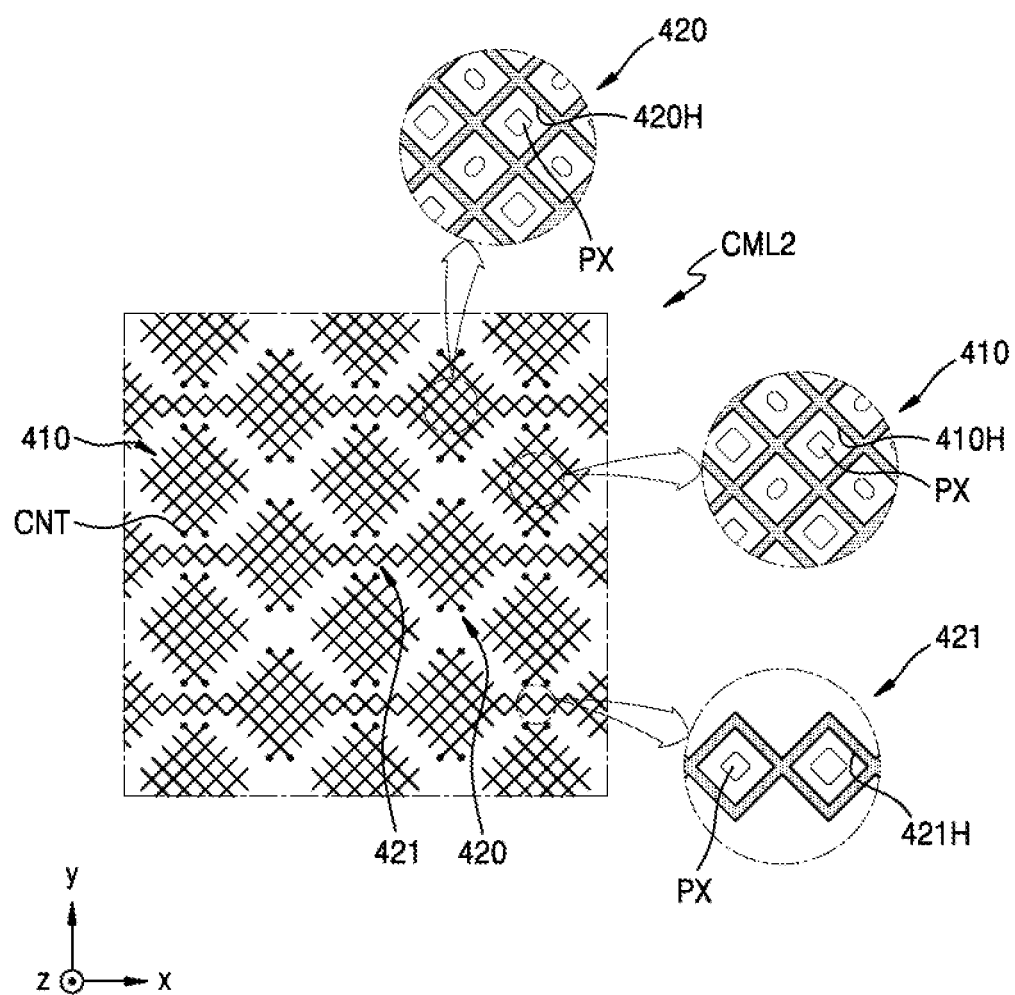

FIGS. 7A and 7B are respectively plan views of the first conductive layer and the second conductive layer in the input sensing layer, according to an embodiment.

Referring to FIGS. 7A and 7B, the first and second sensing electrodes 410 and 420 and the first and second connection electrodes 411 and 421 may have a mesh (or grid) shape. When the first and second sensing electrodes 410 and 420 include a metal layer, the first and second sensing electrodes 410 and 420 may have a mesh shape as illustrated in FIGS. 7A and 7B to prevent the first and second sensing electrodes 410 and 420 from being visible to the user and/or to transmit light emitted from each pixel PX.

As illustrated in the enlarged views of FIGS. 7A and 7B, the first and second sensing electrodes 410 and 420 may include mesh-shaped metal layers including holes 410H and 420H, respectively. Similarly, the first and second connection electrodes 411 and 421 may also include mesh-shaped metal layers including holes 411H and 421H, respectively. The holes 410H, 420H, 411H, and 421H may be arranged to overlap the pixels PX.

As illustrated in FIG. 7A, the first conductive layer CML1 may include the first connection electrode 411. The first connection electrode 411 may be electrically connected to the first sensing electrodes 410 formed at the second conductive layer CML2 which is a different layer from the first conductive layer CML1. The first connection electrode 411 electrically connecting the adjacent first sensing electrodes 410 to each other may be connected to the first sensing electrodes 410 through a contact hole CNT formed in the first insulating layer (see 43 of FIG. 6).

As illustrated in FIG. 7B, the second conductive layer CML2 may include the first sensing electrode 410, the second sensing electrode 420, and the second connection electrode 421. The second sensing electrodes 420 may be connected to each other by the second connection electrodes 421 formed at the same layer as the second sensing electrodes 420. For example, the second sensing electrodes 420 include the same material as that of the second connection electrodes 421 and may be integrally formed with each other. The first sensing electrodes 410 may be electrically connected to each other by the first connection electrodes 411 formed at a different layer from the first sensing electrodes 410. The first sensing electrodes 410 may be connected to the first connection electrodes 411 through the contact hole CNT formed in the first insulating layer 43.

Figure 8:
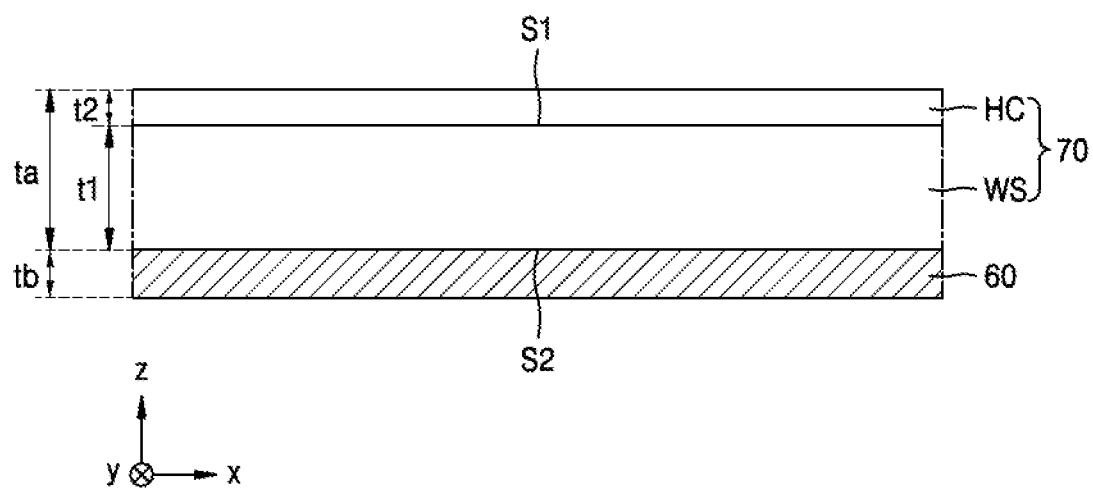
FIG. 8 is a schematic cross-sectional view of a cover window and an adhesive layer of a display apparatus according to an embodiment of the present inventive concept.

FIG. 8 is a schematic cross-sectional view of a cover window and an adhesive layer of a display apparatus according to an embodiment.

Referring to FIG. 8, a cover window 70 may include a window substrate WS and a hard coating layer HC on at least one surface of the window substrate WS.

According to an embodiment, the window substrate WS may include a polymer resin. For example, the window substrate WS may include at least one material selected from polyethersulfone, polyacrylate, polyether imide, polyethylene naphthalate, polyethylene terephthalate, polyphenylene sulfide, polyarylate, polyimide, polycarbonate (PC), cellulose triacetate, cellulose acetate propionate, polyaryleneethersulfones, benzocyclobutene, hexamethyldisiloxane, and polymethyl methacrylate (PMMA). According to an embodiment, the window substrate WS may include a copolymer of a first polymer resin and a second polymer resin.

As a comparative example, when the window substrate includes a glass material, it may be difficult to secure flexibility and there may be a high possibility of cracking or breaking due to external impact. However, according to an embodiment, because the window substrate WS includes a polymer resin, flexibility may be secured and the possibility of cracking or breaking due to external impact may be minimized.

When the window substrate WS includes a specific polymer resin, the sensing sensitivity (or touch sensitivity) of the input sensing layer (see 40 of FIG. 2) of the display apparatus (see 1 of FIG. 2) may deteriorate, as compared with a case in which the window substrate includes a glass material. For example, when the window substrate WS includes PMMA and/or PC, the sensing sensitivity of the display apparatus 1 may deteriorate, as compared to a case where the window substrate includes a glass material. This is because the relative permittivity of the window substrate WS including PMMA and/or PC is less than the relative permittivity of the window substrate including glass.

The relative permittivity of the window substrate WS, more specifically, the relative permittivity of the cover window 70 may affect the sensing sensitivity of the input sensing layer 40 of the display apparatus 1. The relative permittivity is a value represented by a relative ratio of the permittivity of a material layer to the permittivity of the vacuum, and the permittivity is a physical property indicating a size of polarization made by a dielectric in response to an external electric field.

For example, the input sensing layer 40 of the display apparatus 1 may include a touch screen panel (TSP) of a capacitive scheme. The capacitive scheme receives an external input by sensing a magnitude of a capacitance change of the input sensing layer 40 and a position of the input sensing layer 40. For example, a constant electric field may be formed by flowing a certain amount of current through the sensing electrodes (see 410 and 420 of FIG. 5) of the input sensing layer 40. Because a user's body is an electrical charge conductor, a change in the electric field occurs in the corresponding portion of the input sensing layer 40 at the moment the user touches the touch screen. The capacitance changes due to the change in the electric field, and the external input may be received by sensing such a change. Therefore, as the magnitude of the capacitance change increases, the sensing sensitivity of the input sensing layer 40 may be improved.

The cover window 70 may be on the input sensing layer 40 and may be on the outermost side of the product so that the user touches the cover window 70. When the user touches the cover window 70, the electric field changes in a corresponding portion of the input sensing layer 40 through the cover window 70, and the capacitance changes. Therefore, as the relative permittivity of the cover window 70 increases with respect to the same input (i.e., the same touch event), the capacitance change of the input sensing layer 40 may increase, and thus, the sensing sensitivity may be improved.

According to an embodiment, the window substrate WS may include polyvinylidene fluoride (PVDF). The relative permittivity of PVDF may have a value from about 7 to about 7.5. The window substrate WS includes or is PVDF having a high relative permittivity, so that the relative permittivity of the cover window 70 may be improved.

According to an embodiment, the window substrate WS may include a copolymer of a first polymer resin and PVDF. For example, the first polymer resin may be PMMA. The relative permittivity of the window substrate WS may be determined depending on a ratio of the first polymer resin and PVDF. The relative permittivity of the window substrate WS may have a value from about 3 to about 7, or from about 3 to about 6. Specifically, the relative permittivity of the window substrate WS may be about 5.

As a comparative example, when the window substrate includes a polymer resin other than PVDF, for example, PMMA and/or PC, the relative permittivity of the window substrate WS may have a value from about 2.5 to about 3. However, according to an embodiment, because the window substrate WS includes PVDF having a high relative permittivity, the window substrate WS may have a higher relative permittivity than that of the window substrate of the comparative example. Thus, the sensing sensitivity of the display apparatus 1 may be improved.

According to an embodiment, a hard coating layer HC may be on a first surface S1 of the window substrate WS. For example, the hard coating layer HC may be on the first surface S1 of the window substrate WS. The first surface S1 of the window substrate WS may be the outer surface of the window substrate WS facing the user. According to an embodiment, the hard coating layer HC may include polysilsesquioxane or an acrylic polymer material.

According to an embodiment, the hardness of the hard coating layer HC may be greater than the hardness of the window substrate WS. Therefore, the overall hardness of the cover window 70 may be improved, and scratch resistance may be improved. For example, the pencil hardness of the cover window 70 may be about 7H. Also, because the hard coating layer HC includes a fluorine-based compound, the hard coating layer HC may have anti-fingerprint (AF) characteristics. For example, the hard coating layer HC includes perfluoropolyether (PEPE). In an embodiment, the pencil hardness of the hard coating layer HC may be at least about 7H or greater than that (e.g., 8H or 9H).

According to an embodiment, a thickness t1 of the window substrate WS may have a value from about 100 μm to about 650 μm, from about 100 μm to about 550 μm, from about 100 μm to about 450 μm, or from about 100 μm to about 350 μm.

A thickness t2 of the hard coating layer HC may be less than the thickness t1 of the window substrate WS. For example, the thickness t2 of the hard coating layer HC may have a value from about 10 μm to about 50 μm. When the thickness t2 of the hard coating layer HC is less than about 10 μm, it is difficult to secure sufficient hardness, and when the thickness t2 is greater than about 50 μm, the possibility of cracking due to external impact may increase.

A thickness to of the cover window 70, that is, the sum of the thickness t1 of the window substrate WS and the thickness t2 of the hard coating layer HC, may have a value from about 150 μm to about 700 μm, from about 150 μm to about 600 μm, from about 150 μm to about 500 μm, from about 150 μm to about 400 μm, or from about 150 μm to about 300 μm.

Similar to the relationship between the relative permittivity and the sensing sensitivity described above, as the total thickness of the cover window 70 decreases with respect to the same input (i.e., the same touch event), the capacitance change of the input sensing layer 40 may increase, and thus, the sensing sensitivity may be improved.

Table 1 below shows a magnitude of a capacitance change according to a thickness of a cover window with respect to a cover window of Comparative Example 1, a cover window of Comparative Example 2, and a cover window of Example 1.

TABLE 1

| Thickness [μm] | 300 | 400 | 500 | 600 | 700 | 800 | 900 | 1000 |
|---|---|---|---|---|---|---|---|---|
| Comparative Example 1 | 121 | 117 | 111 | 106 | 101 | 96 | 91 | 87 |
| Comparative Example 2 | 72 | 65 | 59 | 55 | 51 | 47 | 44 | 41 |
| Example 1 | 101 | 94 | 89 | 83 | 79 | 74 | 70 | 66 |

The cover window of Comparative Example 1 includes a window substrate having a relative permittivity of about 7.2 and including a glass material. The cover window of Comparative Example 2 includes a window substrate having a relative permittivity of about 2.8 and including PMMA and PC. The cover window 70 of Example 1 includes a window substrate having a relative permittivity of about 5 and including a copolymer of PMMA and PVDF. Comparative Example 1, Comparative Example 2, and Example 1 all include a hard coating layer HC having a thickness of about 50 μm. The unit of the thickness of the cover window is micrometer (μm), and the unit of the magnitude of the capacitance change is femto farad (fF).

Referring to Table 1, it may be confirmed that the cover window 70 of Example 1 generally has a high sensing sensitivity, as compared with the cover window of Comparative Example 2. Also, because the thickness to of the cover window 70 of Example 1 has a value from about 150 μm to about 700 μm, specifically about 400 μm or less, as described above, the cover window 70 may have a sensing sensitivity almost equal to that of the case in which the cover window of Comparative Example 1 has a thickness of about 700 μm or more.

As such, because the cover window 70 according to the embodiment includes the window substrate WS including the polymer resin, the cover window 70 has considerable flexibility, and impact and/or scratch resistance. Also, because the cover window 70 includes PVDF having a high relative permittivity and the thickness thereof is minimized, the sensing sensitivity of the display apparatus 1 may be sufficiently secured. Therefore, the cover window 70 capable of improving the reliability of the product may be provided.

According to an embodiment, an adhesive layer 60 may be in contact with a second surface S2 of the window substrate WS. As described above, the adhesive layer 60 may include an OCA. The relative permittivity of the adhesive layer 60 may be greater than the relative permittivity of the window substrate WS. For example, the relative permittivity of the adhesive layer 60 may have a value of about 7 or more, or about 8 or more. Therefore, the sensing sensitivity of the display apparatus 1 may be improved.

According to an embodiment, a thickness tb of the adhesive layer 60 may have a value from about 100 μm to about 300 μm, or from about 150 μm to about 300 μm. As the thickness t1 of the window substrate WS decreases, the impact resistance of the cover window 70 may decrease. This may cause damage to the display panel (see 10 of FIG. 2) due to external impact and may increase the possibility of bright spot or dark spot defects. As described above, the thickness t1 of the window substrate WS may be minimized to further improve the sensing sensitivity of the display apparatus 1. The above problem may be compensated by increasing the thickness tb of the adhesive layer 60 as much as the reduced thickness t1 of the window substrate WS. For example, the sum of the thickness t1 of the window substrate WS and the thickness tb of the adhesive layer 60 may have a value from about 200 μm to about 950 μm. This is because, for the same thickness, the degree to which the adhesive layer 60 contributes to the impact resistance of the display apparatus 1 is greater than the degree to which the window substrate WS contributes to the impact resistance of the display apparatus 1.

Figure 9:
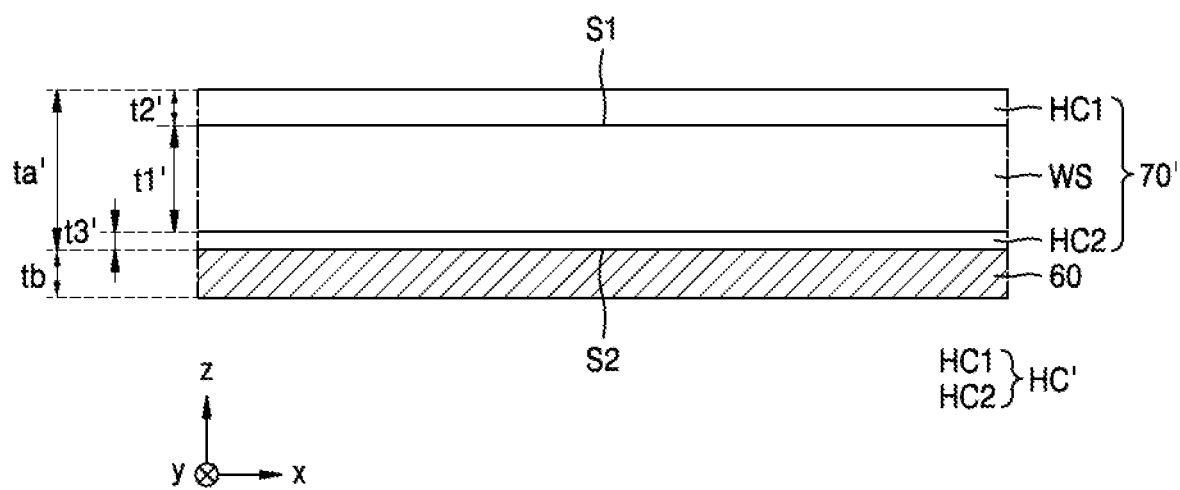
FIG. 9 is a schematic cross-sectional view of a cover window and an adhesive layer of a display apparatus according to another embodiment of the present inventive concept.

FIG. 9 is a schematic cross-sectional view of a cover window and an adhesive layer of a display apparatus according to another embodiment. A description of elements that are the same as or corresponding to the elements described above with reference to FIG. 8 are omitted, and the following description will be mainly given focusing on differences.

Referring to FIG. 9, a hard coating layer HC' may include a first hard coating layer HC1 on a first surface S1 of a window substrate WS and a second hard coating layer HC2 on a second surface S2 opposite to the first surface S1 of the window substrate WS. The second hard coating layer HC2 may be between the window substrate WS and an adhesive layer 60. For example, the adhesive layer 60 may attach the second hard coating layer HC2 and the optical function layer 50 (see FIG. 2).

According to an embodiment, the second hard coating layer HC2 may include polysilsesquioxane or an acrylic polymer material. Also, the second hard coating layer HC2 may include a conductive polymer and prevent external static electricity. In an embodiment, the second hard coating layer HC2 may include a polymer same as or material different from that of the first hard coating layer HC1. According to an embodiment, a thickness t3' of the second hard coating layer HC2 may have a value from about 5 μm to about 20 μm, or from about 5 μm to about 10 μm, and may have, specifically, about 5 μm. In an embodiment, the thickness t3' of the second hard coating layer HC2 may be same as or smaller than the thickness t2' of the first hard coating layer HC1.

Even when the second hard coating layer HC2 is provided, a thickness ta' of a cover window 70, that is, the sum of a thickness t1' of the window substrate WS, a thickness t2' of the first hard coating layer HC1, and the thickness t3' of the second hard coating layer HC2 may have a value from about 150 μm to about 700 μm, from about 150 μm to about 600 μm, from about 150 μm to about 500 μm, from about 150 μm to about 400 μm, or from about 150 μm to about 300 μm.

According to the embodiments as described above, the cover window, which has considerable flexibility, hardness, and scratch resistance, minimizes the occurrence of cracks due to external impact, and minimizes a decrease in the sensing sensitivity of the input sensing layer, and the display apparatus including the cover window may be implemented. Therefore, the cover window having improved product reliability and the display apparatus including the cover window may be provided.

Up to this point, only the cover window and the display apparatus including the cover window have been mainly described, but the disclosure is not limited thereto. For example, it will be understood that a method of manufacturing such a cover window and a display apparatus including the cover window also falls within the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:
1. A display apparatus comprising:
a display panel configured to provide an image; and
a cover window on the display panel,
wherein the cover window comprises:
a window substrate comprising polyvinylidene fluoride (PVDF); and
a hard coating layer directly contacting at least one surface of the window substrate, and wherein the window substrate comprises a copolymer of polymethyl methacrylate (PMMA) and the PVDF.
2. The display apparatus of claim 1, further comprising:
an input sensing layer between the display panel and the cover window and comprising a plurality of sensing electrodes and a plurality of trace lines electrically connected to the plurality of sensing electrodes; and
an adhesive layer between the input sensing layer and the cover window.
3. The display apparatus of claim 2,
wherein a relative permittivity of the adhesive layer is greater than a relative permittivity of the window substrate.
4. The display apparatus of claim 2,
wherein a thickness of the adhesive layer has a value from about 100 μm to about 300 μm.
5. The display apparatus of claim 1,
wherein a relative permittivity of the window substrate has a value from about 3 to about 6, and
wherein a thickness of the window substrate has a value from about 100 μm to about 650 μM.
6. The display apparatus of claim 1,
wherein the hard coating layer has a thickness having a value from about 10 μm to about 50 μm and has a hardness greater than that of the window substrate.
7. The display apparatus of claim 1,
wherein the sum of a thickness of the window substrate and a thickness of the hard coating layer has a value from about 150 μm to about 700 μm.
8. A display apparatus comprising:
a display panel configured to provide an image;
a window substrate disposed on the display panel and comprising a copolymer of a first polymer resin and polyvinylidene fluoride (PVDF),
wherein a relative permittivity of the window substrate has a value from about 3 to about 6; and
a first hard coating layer on the window substrate,
wherein the first hard coating layer includes a fluorine-based compound, and
wherein the window substrate is disposed between the display panel and the first hard coating layer, and
wherein the first polymer resin includes polymethyl methacrylate (PMMA).
9. The display apparatus of claim 8,
wherein a thickness of the window substrate has a value from about 100 μm to about 650 μm, and
wherein a thickness of the first hard coating layer has a value from about 10 μm to about 50 μm.
10. The display apparatus of claim 8, further comprising:
an optical function layer between the window substrate and the display panel;
an input sensing layer between the optical function layer and the display panel; and
an adhesive layer between the optical function layer and the window substrate,
wherein the adhesive layer attaches the window substrate and the optical function layer with each other.
11. The display apparatus of claim 10,
wherein a relative permittivity of the adhesive layer is greater than the relative permittivity of the window substrate, and
wherein a thickness of the adhesive layer has a value from about 100 μm to about 300 μm.

12. The display apparatus of claim 10, further comprising:
a second hard coating layer between the window substrate and the display panel,
wherein the second hard coating layer may include polysilsesquioxane or an acrylic polymer material, and a conductive polymer, and
wherein a thickness of the second hard coating layer is smaller than that of the first hard coating layer.

13. The display apparatus of claim 12,
wherein the thickness of the second hard coating layer has a value from about 5 μm to about 10 μm.

* * * * *